United States Patent [19]

Stofko

[11] 4,183,997
[45] Jan. 15, 1980

[54] BONDING OF SOLID LIGNOCELLULOSIC MATERIAL

[75] Inventor: John Stofko, Charles, Ill.

[73] Assignee: John Jansky, Paris, France

[21] Appl. No.: 839,462

[22] Filed: Oct. 4, 1977

Related U.S. Application Data

[63] Continuation-in-part of Ser. No. 767,261, Feb. 10, 1977, Pat. No. 4,107,379, which is a continuation of Ser. No. 549,663, Feb. 13, 1975, abandoned.

[30] Foreign Application Priority Data

Feb. 22, 1974 [GB] United Kingdom ................ 8084/74
May 8, 1974 [GB] United Kingdom ............... 20227/74

[51] Int. Cl.$^2$ .............................................. B32B 5/16
[52] U.S. Cl. .................................... 428/326; 106/162; 106/203; 106/163 R; 106/213; 156/62.2; 156/336; 264/109; 264/128; 427/399; 427/415; 428/403; 428/533; 428/535; 428/420; 428/537

[58] Field of Search ...................... 156/336, 316, 62.2, 156/318, 307, 319; 428/326, 420, 342, 541, 403, 532–537; 106/162, 203, 163 R, 213; 264/109, 128; 427/399, 415; 536/1; 144/309 B, 309 Q, 317, 327

[56] References Cited

U.S. PATENT DOCUMENTS

| | | | |
|---|---|---|---|
| 2,204,384 | 6/1940 | Salisbury | 106/162 |
| 2,495,043 | 1/1950 | Willey et al. | 428/420 |
| 2,639,994 | 5/1953 | Wilson | 106/163 R |
| 3,565,651 | 2/1971 | Waggle | 106/213 |
| 4,007,312 | 2/1977 | Stofko et al. | 156/62.2 |
| 4,107,379 | 8/1978 | Stofko | 156/62.2 |

*Primary Examiner*—John T. Goolkasian
*Assistant Examiner*—J. J. Gallagher
*Attorney, Agent, or Firm*—Karl W. Flocks

[57] ABSTRACT

Solid lignocellulosic material is bonded together by heating and pressing at a natural wood, pH by reacting sugars, starches or both in the presence of a catalyst capable of catalyzing transformation of the sugars and starches into a solid, insoluble in water, and an alkaline buffering agent if needed, for example to make waterproof plywood or composite products from particulate wood without hydrolytic degradation of the wood.

30 Claims, No Drawings

BONDING OF SOLID LIGNOCELLULOSIC MATERIAL

FIELD OF INVENTION

This is a continuation-in-part of copending application Ser. No. 767,261 filed Feb. 10, 1977 now U.S. Pat. No. 4,107,379, itself a continuation of Ser. No. 549,663 filed Feb. 13, 1975 now abandoned.

This invention relates to the bonding together of solid lignocellulosic materials, particularly of wood.

BACKGROUND

Bonding of lignocellulosic materials, such as wood, is widely used commercially, such as in the manufacture of plywood and board from particulate wood. In present commercial bonding procedures, adhesives, such as urea- or phenol formaldehyde are employed, which are spread or otherwise applied to the surface of the material, and penetrate the wood structure whereby bonding is effected by the adhesive.

Procedures have been proposed to effect such bonding by chemical reactions between reagents and the wood itself, but have not met commercial acceptance. Thus, U.S. patents in the names of Willey, et al U.S. Pat. No. 2,495,043 and Wilson, U.S. Pat. No. 2,639,994, suggest the treatment of wood with acid, followed by pressing. Neither process achieves satisfactory results, i.e. bonding of adequate strength, possibly because, at any reasonable pressure, i.e. a pressure at which the cellular structure of the wood is not collapsed, only a fraction of the surfaces to be bonded come into contact because of the uneven and cellular character of the wood surface.

Acids have an hydrolytic effect upon cellulose of wood and thus cause permanent loss in strength. For example, treating of wood in autoclave with 0.5% hydrochloric acid at 9 atmospheres (132 psi) pressure which correspond to 348° F. temperature for 15 minutes yields 22% of simple sugars by weight of the wood. Hydrolysis of wood carbohydrates to sugars results in significant loss of strength because, besides partial transformation of carbohydrates to sugars, unhydrolyzed carbohydrates are depolymerized to a high degree which means splitting to shorter molecular chain fragments. It is not possible to confine this hydrolytic degradation to a thin surface layer with the intention of producing a "bonding layer" without affecting adjacent layers. Those adjacent layers are always at least partially degraded with significantly decreased wood strength.

Likewise, Salisbury U.S. Pat. No. 2,204,384, does not produce bonding which is resistant to cold or hot water. Moreover, bonding adhesive is applied in cold conditions. Starch and sucrose are stabilized by non-volatile acids, mixed at moderate temperatures, then cooled to produce a water-soluble adhesive in powder form which is thereafter diluted in water before use.

SUMMARY

According to one aspect of the present invention, there is provided a method of bonding solid lignocellulosic materials, which comprises providing one or more sugars or starches or mixtures thereof and a catalyst capable of effecting the transformation of such sugars and starches, on a surface of the material and pressing surfaces of the material together at an elevated temperature and pH such that hydrolytic degradation of the wood is avoided, to provide a waterproof bond.

The method of the invention may be used for manufacture of laminates, plywood and composite products from particulate wood without the use of traditional adhesives. By means of the present method any lignocellulosic material can be bonded, regardless of size and shape.

It is believed that bonding is created by chemical transformation of the sugars and starches which are applied to the wood surface and possibly by coupling of their transformation products to wood lignin.

The chemical reactions involved in the bonding system in the present invention have not been fully elucidated and applicant does not wish to be bound to any theory. However, theoretically, several reaction systems may be involved at the same time, such as depolymerization of sugars and starches, dehydration of monosaccharides to furane-type compounds, condensation of furane monomers with lignin or other phenolic compounds present in wood, and with each other.

A basic feature of the present invention, by which it is distinguished from processes based on the hydrolysis of wood carbohydrates, is that sugars and starches can be transformed to a solid, insoluble in water, or a condensate with wood phenolics without using strong acids which cause wood hydrolysis with detrimental effect on wood strength. Simple sugars do not need any hydrolysis; disaccharide-sucrose is easily hydrolyzed to simple sugars at low concentration of hydrogen ion, ammonia ion and other compounds such as dimethyl formamide; and starch is hydrolyzed in hot water. Further chemical transformation of simple sugars to a solid insoluble in water takes place at much higher pH which can be created without using acids and which do not have an hydrolytic effect on wood. As a result, no wood degradation is caused and full strength of wood can be utilized. Moreover, sugars and starches when applied to wood surface to be bonded desirably form a continuous film on that surface filling cellular and other gaps and thus providing much higher level of bonding than in processes based on wood hydrolysis.

It has been found that the strength of bonds formed between pieces of wood using the present invention is at least comparable to the strength of bonds achieved by hitherto used adhesives. Moreover, the bond is waterproof.

DETAILED DESCRIPTION OF EMBODIMENTS

In the manufacture of plywood it is only necessary to cover a surface of a wood veneer with a carrier, e.g. liquid, containing sugars and/or starches and a catalyst, bring such surface into contact with the surface of another veneer which may or may not have a coating of the bonding composition so that there is an interfacial layer of the bonding composition between the surfaces to be bonded, and press them at an elevated temperature in a conventional press for a time sufficient to achieve bonding by the transformation bonding reactions. Similarly, various forms of wood particles—coated with the bonding composition—can be so pressed in order to produce various boards.

Alternatively, the liquid composition containing sugars and/or starches and a catalyst may be heated at temperatures of 100°–130° C. for 30–120 minutes before application to the material to be bonded to transform sugars and starches into furane type intermediate products. The hot composition can be applied to a wood surface in the same way as an unheated one, followed by pressing under heat and pressure for a time sufficient to produce bonding. Using the hot composition may be advantageous in cases where shorter pressing times are required.

In some cases it may be advantageous to expose wood veneers or particles covered by the liquid bonding composition to an elevated temperature for a short period of time prior to pressing. Such preheating causes partial chemical transformation of the sugars and starches which may shorten the pressing time or lower the pressing temperature required. Temperatures of preheating up to 140° C. may be employed for a period of time up to about 60 minutes.

It has been found that the amount of catalyst, pressing temperature and pressing time can be minimized and bond properties enhanced if the sugar-starch-catalyst mixture is, as described above, precooked prior to applying to wood surface or the wood surface covered with the mixture is dried prior to pressing to evaporate the liquid carrier from the bonding composition. In this way the chemical transformation of carbohydrates into water-insoluble solid is speeded up.

The bonding composition may include a liquid carrier which is non-reactive with the lignocellulosic material, such as water, ethyl alcohol and other solvents. The quantity of carrier in the bonding composition is merely that sufficient to provide a composition which can be easily handled and applied in the desired manner and at the desired rate to the wood. In general, the vapors from the carrier may readily escape from the unsealed press during the pressing operation. Mixtures of various sugars and starches as well as mixtures of various catalysts in a carrier may be employed.

The composition may also contain other chemical reagents capable of affecting the bonding reaction, i.e. agents accelerating or reducing the extent of the reaction in which the sugars and starches participate, plasticizers or crosslinking agents, depending upon the reaction conditions which may vary widely. Such reagents may be incorporated in the desired amount in the carrier liquid together with the sugars and/or starches and the catalysts. As examples of reagents capable of accelerating the rate of reaction, there may be briefly mentioned ethylene glycol, furfuryl alcohol, amines in general, e.g. ethyl amine, n-propyl amine, cetyl amine, diethyl amine, methyl ethyl amine, diphenyl amine, triethyl amine, aniline, etc., and amine salts, e.g. methylammonium chloride, dimethylammonium bromide, trimethylammonium nitrate, monoethanolamine, n-phenyl diamine, polyvinyl alcohol, polyvinyl chloride and others.

The quantity of accelerators useful in the bonding composition is subject to very wide range and is dependent on a variety of factors including the activity of the particular accelerator and its cost, this latter factor being a highly important consideration from the point of view of providing an economically feasible product. In general, however, the quantity of accelerator will be anywhere from as little as about 2% of the quantity of sugars and starches to as much as 30% of the quantity of sugars and starches, but usually will be on the order of about 4–10% of the quantity of sugars and starches.

Excess amounts of sugars and starches applied to the surface of wood do not affect the efficiency of bonding, but are uneconomical. It is merely necessary to have sufficient carbohydrate and catalyst to effect the bonding reaction in a press under heat and pressure. The minimum amount of carbohydrate and catalyst required is variable depending on the pH of the wood and sugars and starches, kind and reactivity of sugars and starches, temperature moisture content of wood, desired reaction speed and other factors.

The optimum amount of sugar and starches used will vary depending upon the character of the wood, reactivity or other properties of the sugars and starches used, surface roughness of the wood and the pressing conditions desired, bearing in mind that the quantity of bonding composition applied should be sufficient to fill the open cell cavities which are present on the surface of wood thus increasing the contact area between adjacent wood surfaces and substantially improving the bonding strength. In case of bonding veneers, only a film of the composition need be applied which can be conveniently done by brushing, spraying or roller spreading. Typically an amount of the bonding composition may be employed which will provide from 2 to 32 grams of sugars and starches per 1000 $cm^2$ of area.

From the preceding, it will be seen that a wide variety of sugars and starches may be employed, including monosaccharides and disaccharides, e.g.: mannose, glucose, maltose, lactose, sucrose; starches such as amylose and amylopectin, dextrin, wheat or corn flour; molasses of various origins and mixtures of sugars and starches. Inexpensive molasses represents an attractive possibility.

The catalysts which may be used include dimethyl formamide with iodine, dimethyl sulfoxide, propylene oxide with ethylene glycol and zinc chloride, both organic and inorganic salts, such as aluminum chloride, ammonium chloride, ammonium nitrate, sodium nitrate, potassium nitrate, ammonium sulfate, potassium tartrate, sodium phosphate, calcium phosphate, sodium sulfate, zinc chloride, diammonium phosphate, superphosphate and others. It is preferred to use the ammonium or sodium salts. Nitrates and phosphates are most effective and economical. Phosphates in addition to catalyzing sugar and starch transformation, also provide to some degree fire retardant treatment to the wood.

The amount of catalyst present is generally from 1 to 50% by weight based on the sugars and starches and particularly in cases when a higher degree of fire retardancy is desired up to about 100% or even more; the preferred ratio depends on the identity of sugars and starches and the kind of catalyst. It is preferred to keep the amount of catalyst used to the minimum level necessary to catalyze the sugar and starch transformation into the furane type compounds and their polymerization. A large excess of catalyst without buffering may be harmful to wood strength over a long period of time. The transformation of polymeric starches, such as potato starch, into furane type compounds requires a somewhat higher proportion of catalyst than simpler sugars, such as glucose or sucrose, for a given reaction rate.

It has now been found that chemical transformation of sugars and starches should take place at pH which are close to natural pH of wood, i.e. 3.5–5.5. In order to maintain the pH in the desired range, alkaline materials may be used. For example, a 20% water solution of ammonium nitrate has a pH of about 6.5. At higher temperature ammonium nitrate dissociates and the pH goes down to about 2. If the pH of the solution is increased to about 10.5 by adding alkali, e.g. sodium or ammonium hydroxide, the pH at higher temperatures drops to the level of the wood pH so that pH of the product is between 3.5–5.5 depending upon the pH of wood. Maintaining the pH of the liquid carrier and the final product at the proper level eliminates any hydrolytic effect with its resulting strength decrease of wood, and this is of crucial importance for bond quality.

It will be understood from the listing of catalysts above that the use of some of these, i.e. those having a more acid pH, will cause the pH to go below the pH of the wood during the heating; these particular catalysts, such as ammonium chloride, ammonium nitrate, ammonium sulfate, and zinc chloride, are acid catalysts, and these should be used in conjunction with an alkaline material which exerts a "buffering" effect, i.e. keeps the pH from becoming less than the minimum desired. On the other hand, other catalysts will not, during heating, cause the pH to drop below the minimum, and these, including sodium nitrate, potassium nitrate, sodium phosphate, diammonium phosphate and superphosphate, may be considered alkaline catalysts, and they may be used without any buffering agent.

In a preferred embodiment of the invention, a mixture of sugars and starches, such as sucrose and wheat flour, is used. It is advantageous to use sugars and starches of approximately the same decomposition rate. Simple sugars and starches are preferred to polymeric ones because of their higher decomposition rate. Price and availability, however, are probably the most important factors in deciding which raw material to use.

Pressing conditions in the press will vary widely depending upon variables, such as kind of sugars and starches, kind of wood, kind and amount of catalyst and requirements on the product. As usual for any given system, the lower the temperature, the longer the pressing time and vice versa. The pressing temperature should not exceed the temperature at which charring of the lignocellulosic material will occur nor should the pressure exceed that at which the desired specific gravity of the product is exceeded. The preferred temperature range is 140° to 250° C. and the preferred pressure range 5 to 50 kg/cm$^2$. The pressing time required under these conditions is a time needed to rise the core temperature at which chemical transformation of sugars and starches to a solid insoluble in water takes place, which is 160° to 212° C. depending upon kind and amount of catalyst.

The invention may be applied to any kind of wood bonding such as in plywood or composite board production. In the production of composite products such as particle or fiber boards, the same procedure is followed as for plywood manufacture except that the particles are covered by the carrier containing sugars and starches and catalyst which can be achieved by spraying and mixing followed by board formation and pressing in the press.

Embodiments of the invention will be described by way of illustration in the following Examples. Percentages are given by weight.

EXAMPLE I

Yellow pine veneers, 30 cm square, 3.5 mm thick, with moisture content of about 4%, were brushed on both surfaces with water solution containing 35% of wheat flour, 15% of sucrose, 2.5% ammonium chloride, and 2.5% ammonium sulfate, in the amount of 18 grams of the solution per 900 cm$^2$. After application of the solution the veneers were exposed to temperature of 150° C. for four minutes, whereupon the surfaces of the veneers became completely dried and turned black. Two veneers not covered with the bonding solution were wetted on one surface with water in the amount of about 5 grams per area of 900 cm$^2$. Veneers with wetted surfaces were laid up adjacent veneers having dried bonding solution on both surfaces in such a way that wetted surfaces were in contact with dried bonding solution on veneer located between them with fiber direction perpendicular to the fiber direction of the surface veneers. Laid up veneers were pressed in cold press at 14 kgs/cm$^2$ for 5 minutes. After removal from the press veneers were stuck together so that they could be handled without danger of separating. Such prepressed plywood samples were then pressed at temperature of 170° C. and pressure of 14 kgs/cm$^2$ for ten minutes. Plywood was boiled for 72 hours in water, and after cooling to ambient temperature a knife test according to the British standard was performed. The results showed that bonding of exterior-type quality comparable to conventional phenol-formaldehyde bonding was obtained.

EXAMPLE II

Samples of Douglas fir plywood were made under conditions of Example I except that the veneers were brushed with water solution containing 25% of wheat flour, 20% of black strap molasses, 2.5% of ammonium chloride, and 2.5% of ammonium sulfate. Strength tests showed shear strength of about 16 kg/cm$^2$ which was comparable to similar products using phenol formaldehyde adhesive. Shear strength in wet conditions after 4 hours boiling water followed by 20 hours drying at 53° C. and again 4 hours boiling was about 8 kg/cm$^2$.

EXAMPLE III

Samples of pine plywood were made under conditions of Example I except that instead of dry veneers, wet veneers having moisture content of more than 35% were brushed with water solution containing 35% of wheat flour, 15% of sucrose, 1.5% of ammonium chloride, and 1.5% of ammonium sulfate in the amount of about 18 grams of the solution per area of 900 cm$^2$. After application of the solution, veneers were dried in conventional veneer drier at the temperature of 145°–175° for five minutes, whereupon the veneer surfaces became completely dried and turned black. Tests showed that, after pressing, exterior quality bonding was obtained.

EXAMPLE IV

Douglas fir shavings having a moisture content of about 4% were sprayed with the water solution containing 35% of sucrose and 10% of ammonium nitrate. The amount used was 25% of the solution to wood weight. Sprayed particles were then dried at a temperature of 155° C. for five minutes. After drying the particles turned brown and had about 4% moisture content. A particle mat was formed from dried particles which was transferred into a hot press with press platten at temperature of 170° C., and particle board of 12 mm thickness was pressed for ten minutes. After cooling to room temperature internal bond tests in dry condition, and after 2 hours boiling in water were performed. The tests showed internal bond value of 8 kgs/cm$^2$ in dry condition, and 2 kgs/cm$^2$ after boiling.

EXAMPLE V

Particle board of pinewood particles was made at the same conditions as in Example IV, except that particles were sprayed with a solution containing 30% of wheat flour, 15% of sucrose, and 15% of ammonium nitrate. Strength properties were about the same as those in Example IV.

EXAMPLE IV

Particle board of okume-wood particles was made under the same conditions as in Example IV, except that particles were sprayed with a solution containing 60% of black strap molasses and 8% of ammonium nitrate. Strength properties obtained were about equal to those obtained in Example IV.

EXAMPLE VII

Pinewood particles having moisture content of about 6% were sprayed with a water solution containing 40% of sucrose, 25% of superphosphate and 7% of zinc chloride. The amount used was 15% of the solution to wood weight. Sprayed particle were dried in oven at 250° temperature for 30 minutes to about 4% moisture content. A particle mat was formed from dried particles which was transferred into the hot press with press platten at temperature of 410° F. and particle board of 12.7 mm thickness was pressed for 10 minutes. After cooling to room temperature, internal bond, thickness swelling after 24 hours soaking in cold water and after 2 hours boiling in water were tested. Tests showed internal bond value of 7.5 kg/cm$^2$, 6% swelling in cold water and 8% swelling in boiling water.

EXAMPLE VIII

Sucrose and dimethylformamide in the ratio 6:4 parts by weight with traces of iodine were cooked for 30 minutes. A light brown liquid was obtained. One part of zinc chloride was dissolved in water and added to the cooked sucrose-dimethylformamide mixture so that final ratio of components were 6:4:1 parts by weight. The amount of 10% of the solution to wood weight was sprayed on pine particles which were then dried in oven at 250° F. for 30 minutes to about 4% moisture content. A particle board was formed from dried particles which was transferred into the press platten at the temperature of 410° F. and particle board of 12.7 mm thickness pressed for 10 minutes.

EXAMPLE IX

Following the procedure of Example VIII, a particle board was made using 10% of the solution made of sucrose, dimethylsulfoxide and zinc chloride in the ratio 6:6:1 by weight.

EXAMPLE X

Following the procedure of the Example VIII, a particle board was made using 10% of the solution to wood weight made of sucrose, ethylene glycol, propylene oxide and zinc chloride in the ratio 6:3:1.7:1. Propylene oxide was added to cooked mixture of sucrose, ethylene glycol and zinc chloride after cooling to room temperature. Particle boards made using procedure of Examples VIII to X had good properties and were boiling waterproof.

EXAMPLE XI

Pressing time and pressure in particle board production according to the present invention can be further reduced by using powdery or melted sucrose in place of a solution thereof, anhydrous aluminum chloride as the catalyst either alone or with others, and without a liquid carrier. Aluminum chloride, AlCl$_3$ or Al$_2$Cl$_6$ is marketed as a powder.

A. POWDER APPLICATION PROCEDURE

A composition of 87–97% sucrose, 2–8% aluminum chloride and 1–5% of ethylene glycol is thoroughly mixed. A small amount of ethylene glycol, OHCH$_2$CH$_2$OH, is used to obtain a more homogeneous distribution of aluminum chloride in the sucrose and to accelerate the transformation reactions. The percentage of aluminum chloride for a particular kind of wood will vary due to differences in chemical composition of wood.

Sucrose-aluminum chloride mixture is admixed with wood particles so that a uniform distribution of sucrose on particle surfaces is obtained. Moisture content of wood should be under 5%, since the lower the moisture content the higher the reaction speed obtained. Hot particles coming from the particle drier can be advantageously mixed with the sucrose-aluminum chloride powder.

Particles covered by sucrose-aluminum chloride powder can be pressed into boards without predrying. Since powder is slightly wet, good attachment to wood particles is obtained so that no accumulation of powder on the lower caul plate is observed. At pressing temperatures, sucrose is transformed to liquid which plasticizes the wood so that lower pressures are needed to obtain the final compression of the particle mat.

Results obtained with using powder application procedure at 25 kg/cm$^2$ pressure are presented in Table 1, below:

Table 1

| | Results Obtained with Sucrose Powder | | | | | | | |
|---|---|---|---|---|---|---|---|---|
| # | Reagent Components % to wood | Thickness mm | Press Temp. ° C. | Press Time min. | Specific Gravity | Internal Bond kg/cm$^2$ dry | boiled | Thickness Swelling % |
| A-1 | 10 Su + 0.3Al + 2EG | 10 | 175 | 5 | 0.780 | 8.3 | 2.18 | 6.5 |
| A-2 | 10 Su + 0.5Al + 1EG | 16.8 | 175 | 10 | 0.737 | 7.2 | 1.6 | 8.0 |
| A-3 | 10 Su + 0.6Al + 0.25EG | 10 | 175 | 5 | 0.681 | 7.5 | 2.5 | 7.4 |
| A-4 | 10 Su + 0.67Al + 3.3EG | 18 | 190 | 6 | 0.740 | 7.5 | 2.4 | 7.1 |
| A-5 | 10 Su + 0.6Al + 2.5EG | 19 | 190 | 6 | 0.730 | 7.5 | 0 | 4.7 |

Su = sucrose, Al = aluminum chloride, EG = ethylene glycol

B. HEATING APPLICATION PROCEDURE

A composition of 95–99% of sucrose and 1–5% of anhydrous aluminum chloride is thoroughly mixed.

The sucrose-aluminum chloride mix is heated under constant mixing until the sucrose is transformed into black viscous liquid. One hundred gms. of a composition containing 98.5% of sucrose and 1.5% of aluminum chloride is transformed to a black liquid in a beaker heated on a heating plate in about three minutes.

The hot black melted sucrose is applied to wood particles by spraying or rubbing (Lödige system) as an adhesive. Ethylene glycol can be used to adjust viscosity if necessary. Application facility has to be kept at higher temperature because melted sucrose is liquid only while hot. It has been found that the addition of ammonium nitrate to hot melted sucrose before application to wood speeds up the bonding reaction.

Particles spread with melted sucrose can be pressed to boards without any predrying. As long as spread particles are warm melted sucrose provides a good tackle so that prepressing produces well prepressed particle mat. Upon cooling melted sucrose becomes very viscous, almost solid, so that it can not be spread. If cooling occurs the resultant solid is heated so that it becomes liquid again. It is advantageous to apply hot melt to hot particles coming from the particle drier.

Results obtained with cooking application procedure are presented in Table 2, below.

followed by keeping them in the press at zero pressure for an additional 10 and 7 minutes, respectively. The central portion of each sample became fully cured.

The amount of sucrose which has to be used to obtain good bonding of particles depends on the particle geometry. The amount of 10% to wood weight was used because the redwood sawdust used was very fine with great surface area. Amounts between 4 and 10% will be appropriate for commercial particles. The amount of aluminum chloride to be used will vary with wood species. Percentages from about 0.2 to 1.0% to wood weight appear realistic. For any particular wood species the percentage of aluminum chloride has to be found through routine experimentation. The amount of ammonium nitrate between about 0.5 to 4% appears realistic, although this may vary somewhat depending on the particular wood species.

Table 2

Results Obtained with Melted Sucrose

| # | Reagent Components % to wood | Thickness mm | Press. Temp. °C. | Press Time min. | Specific Gravity | Internal Bond kg/cm² dry | Internal Bond kg/cm² boiling | Thickness Swelling % |
|---|---|---|---|---|---|---|---|---|
| B-1 | 17Su + 0.4Al + 0.9W + 1.75EG | 10 | 175 | 8 | 0.750 | 7.2 | 2.0 | 6.5 |
| B-2 | 17Su + 1.2Al + 1W | 10 | 190 | 5 | 0.560 | 5.4 | 2.4 | 3.8 |
| B-3 | 17Su + 0.3Al + 1 W | 10 | 190 | 10 | 0.570 | 5.6 | 2.5 | 8.4 |
| B-4 | 17 Su + 0.6 Al + 1W | 10 | 190 | 5 | 0.750 | 6.8 | 2.4 | 7.6 |
| B-5 | 8.5Su + 0.2Al + 0.45W + 10EG | 10 | 175 | 8 | 0.670 | 6.4 | 1.9 | 8.7 |
| B-6 | 9.8Su + 0.2Al + | 19 | 190 | 6 | 0.769 | 8.0 | 0 | 9.0 |
| B-7 | + 0.89W + 0.81EG + | 18.5 | 190 | 6 + 10 | 0.761 | 8.0 | 2.4 | 7.2 |
| B-8 | + 1.18AN | 18.8 | 190 | 10 | 0.747 | 7.5 | 0 | 9.3 |
| B-9 | | 17.1 | 190 | 8 + 7 | 0.775 | 8.7 | 3.8 | 6.4 |
| B-10 | 18.6Su + 0.4Al + 1.78W + 1.62EG + 2.36 AN | 18.3 | 190 | 6 | 0.798 | 12.7 | 3.4 | 7.8 |

Su = Sucrose, Al = Aluminum chloride, W = Water, AN = Ammonium nitrate

C. DISCUSSION OF THE RESULTS OF EXAMPLE XI

Anhydrous aluminum chloride was found to be an effective catalyst with powdery or melted sucrose. The necessity of predrying the wood particles before pressing was eliminated and pressing times and pressures substantially reduced. Pressing time depends upon the amount of the catalyst and water present in particles. The lower the amount of water and the higher the amount of catalyst, the faster the bonding reaction proceeds. By using sucrose in powder or as a melt the amount of water in the reaction system is substantially reduced. Incorporation of ethylene glycol into the system instead of water for the purpose of obtaining a better chloride distribution in powdery sucrose or for viscosity adjustment in melted sucrose was found beneficial. Ethylene glycol probably improves heat transfer into the panel center. The amount of aluminum chloride should be kept at the lowest possible level for the particular wood species and desired pressing time.

It was found that a panel of 19 mm thickness is in 6 minutes at 190° C. cured to a degree that it can be removed from the press. Although internal bond in dry condition is fully developed, bonding reaction in the middle of the panel is not completed as can be seen from boiling tests. If additional heat exposure is provided, e.g. by hot stacking of panels taken from the press, the central portion of the panel also becomes fully water-boiling proof. Samples No. B-7 and B-9 in Table 2 were pressed for 6 (Sample B-7) and 8 (Sample B-9) minutes, Strap molasses will react similarly as melted sucrose does with aluminum chloride provided that water content of the molasses is reduced prior to incorporating the aluminum chloride.

Additional tests carried out with plywood have shown that application of aluminum chloride as a catalyst in plywood compositions instead of ammonium sulfate speeds up the bonding reaction.

EXAMPLE XII

Studies of curing temperature—time relations as well as the exploration of possibilities of accelerating the bonding reaction were conducted. In order to determine the minimum pressing time at various temperatures 2.5 mm thick samples of particle boards were made at temperatures of 260°; 280°; 300°; 320° and 350° F. (126°; 138°; 148°; 158°; 176° C.). Thickness swelling after 24 hours cold soaking in water and after 2 hours boiling in water were used as the criteria for determining whether or not the bonding reaction was completed. Specific gravity of samples was around 0.730. Douglas fir, sugar pine and Incance cedar particles were used in this study. Results presented in Table 3 make possible a conclusion that:

At a temperature of 175° C. the bonding reaction was completed in 1 minute, at 160° C. in 2.5 to 5 minutes, at 150° C. in 5 to 10 minutes, at 140° C. in 10 to 30 minutes and at 130° C. in 15 to 60 minutes, depending on the wood species. It appears probable that pH of wood affects the reaction time.

TABLE 3

| WOOD SPECIES | PRESSING TIME MIN → | 176° C. (360° F.) | | 158° C. (320° F.) | | | 148° C. (300° F.) | | | | 138° C. (280° F.) | | 126° C. (260° F.) | | |
|---|---|---|---|---|---|---|---|---|---|---|---|---|---|---|---|
| | | 1 | 2 | 2 | 3 | 5 | 3 | 5 | 10 | 20 | 10 | 30 | 10 | 15 | 60 |
| SUGAR PINE | 24 hrs soak | 10.5 | | | 16.9 | 9.75 | | 20.0 | 14.9 | | 11.1 | 11.9 | | 23.6 | 10.85 |
| | 2 hrs boil | 19.2 | | | 18.7 | 18.5 | | 23.6 | 25.0 | | 57.0 | 30.9 | | 82.0 | 30.4 |
| DOUGLAS FIR | 24 hrs soak | 17.6 | 9.6 | | 11.5 | 7.7 | | 31.2 | 16.3 | 13.3 | 11.3 | 13.8 | | 14.7 | 7.7 |
| | 2 hrs boil | | | | | 19.2 | | | 18.6 | 15.3 | | 25.4 | | | 13.5 |
| ENCANCE CEDAR | 24 hrs soak | 8.7 | 9.3 | 13.0 | 12.2 | 8.9 | 13.6 | 13.0 | 11.2 | 6.95 | 11.8 | 11.1 | 36.5 | 15.0 | 11.1 |
| | 2 hrs boil | | | | | 15.5 | | | 24.4 | 15.2 | | 13.3 | | | 13.4 |

EXAMPLE XIII

Wood particles having a form of wood fiber produced by thermomechanical process such as that of Asplund Difibrator, with a moisture content of 6%, were sprayed with water solution containing 36% of sucrose and 10% of ammonium nitrate. Total amount sprayed (of the solution) was 15% in relation to oven-dried weight of fiber. After air drying to a moisture content of about 8%, the fiber mat was hand-formed and ¼" thick hard-board pressed from the mat at a temperature of 450° F. and at a pressure of ca 550 to 150 PSI, for 3½ minutes. Hardboard had the following properties: specific gravity 1.05; modulus of rupture 4200 psi, modulus of elasticity 530,000 PSI: internal bond 170 PSI; thickness swelling after 24 hours soaking in water 12% and after 2 hours of boiling in water 24.5%.

EXAMPLE XIV

Using the procedure and composition of Example XIII with the exceptions noted below, composite board was made from wood fibers using a solution:

(a) In a first sample, the 10% of ammonium nitrate was buffered to pH 10.5 by adding sodium hydroxide.

(b) In a second sample, the ammonium nitrate was replaced with an equal amount of sodium nitrate.

(c) In a third sample, the ammonium nitrate was replaced with an equal quantity of potassium nitrate.

(d) In a fourth sample, the ammonium nitrate was replaced with an equal amount of superphosphate.

(e) And in a fifth sample, the ammonium nitrate was replaced with an equal quantity of diammonium phosphate.

Boards had properties comparable to properties of boards of Example XIII. Buffering was used to adjust the pH of the final product to the level of natural pH of wood which is 3.5–5.5. Buffering was found advantageous with ammonium nitrate but unnecessary with potassium and sodium nitrates. At quantities indicated in Example XIII, superphosphate and diammonium phosphate do not need any buffering. At higher quantities of superphosphate and diammonium phosphate, which might be desired to provide a higher level of flame retardancy, buffering might be advantageous.

From a review of these examples, it is apparent that the addition of a small amount of sugar and/or starch and catalyst, preferably a salt as designated, to the surfaces to be bonded leads to bond formation under heat and pressure. The strength of the bond is comparable to the strength achieved by traditional adhesives and the bonds are resistant to water. The economical advantage of such system is greater because the price of sugars and starches applicable in this bonding system represents only about ½ to 1/9 of the price of the most extensively used adhesives such as urea or phenol formaldehyde adhesives.

It will be obvious to those skilled in the art that various changes may be made without departing from the scope of the invention and the invention is not to be considered limited to what is described in the specification.

I claim:

1. A method of bonding solid lignocellulosic materials and thereby producing a waterproof bond, which comprises
   providing on a surface of said solid lignocellulosic material an adhesive-free bonding material consisting essentially of at least one sugar, starch or mixture thereof and an amount sufficient to catalyze transformation of the sugar or starch of a catalyst capable of transformation of the sugar or starch to cause waterproof bonding of adjacent lignocellulosic surfaces by means of the intermediate layer of adhesive-free bonding material therebetween, said catalyst being an alkaline salt or a mixture of an alkaline material and an acidic salt so that said bonding material will not decrease the pH after heating of the solid lignocellulosic material to below about 3.5, and
   pressing surfaces of the lignocellulosic material together at an elevated temperature and for a time sufficient to effect said bonding by said transformation reactions of the carbohydrate, and wherein the time, temperature and pressure are sufficient to produce a waterproof bond.

2. A method according to claim 1, in which the carbohydrate is applied and is selected from disaccharides, monosaccharides, molasses and starch obtained from wheat or corn flour.

3. A method according to claim 1, in which the adhesive-free bonding composition contains at least one sugar and at least one starch.

4. A method according to claim 3, in which the adhesive-free bonding material contains substantially equal weights of sugar and starch.

5. A method according to claim 1, in which the amount of catalyst present is from 1 to 50% by weight of the amount of sugar and starch in the adhesive-free bonding material.

6. A method according to claim 1, in which the adhesive-free bonding material contains a liquid carrier which does not react with the sugar or starch.

7. A method according to claim 6, in which the liquid carrier is selected from water and ethanol.

8. A method according to claim 1, in which the adhesive-free bonding material is applied to the surface in an amount to give from 2 to 32 grams of sugar, starch or mixture thereof per 1000 cm$^2$ of surface.

9. A method according to claim 1, in which the surfaces are pressed together at a temperature from 140° to 250° C. and a pressure from 5 to 50 kg/cm².

10. A method according to claim 1, in which the adhesive-free bonding comprises a preformed composition of said sugar, starch or mixture thereof and said catalyst which is heated before application to the surface.

11. A method according to claim 10, in which the adhesive-free bonding composition is heated at a temperature from 100° to 130° C. for a period from 30 to 120 minutes.

12. A method according to claim 1, in which the lignocellulosic material is heated after application of the adhesive-free bonding material and before pressing.

13. A method according to claim 12, in which the lignocellulosic material is heated at a temperature not exceeding 140° C. for a period up to 60 minutes.

14. A method according to claim 1, in which the lignocellulosic material comprises wood veneers which are laminated together during the pressing.

15. A method according to claim 14, in which the adhesive-free bonding material is applied to one only of the respective veneer surfaces which are pressed together.

16. A method according to claim 1, in which the lignocellulosic material comprises particles of wood.

17. A method according to claim 1, wherein said catalyst is selected from the group consisting of dimethyl formamide with iodine, dimethyl sulfoxide, propylene oxide with ethylene gylcol and zinc chloride, aluminum chloride, ammonium chloride, ammonium nitrate, sodium nitrate, potassium nitrate, ammonium sulfate, potassium tartrate, sodium phosphate, calcium phosphate, sodium sulfate, zinc chloride, diammonium phosphate, superphosphate, and mixtures thereof, said catalyst being in admixture with an alkali to provide a pH before heating in the alkaline range when said catalyst is an acid catalyst.

18. A method in accordance with claim 17 wherein said catalyst comprises aluminum chloride.

19. A process in accordance with claim 1 wherein said adhesive-free bonding material further comprises a non-reactive liquid carrier and said pressing is carried out in an unsealed press to permit the escape of vapors of said liquid carrier.

20. A method in accordance with claim 1 wherein said sugar, starch or mixture thereof comprises strap molasses.

21. A method in accordance with claim 1 wherein said adhesive-free bonding material further comprises an accelerating reagent.

22. A method in accordance with claim 21 wherein said accelerator is selected from the group consisting of ethylene glycol and amines.

23. A method in accordance with claim 22 wherein said adhesive-free bonding material is substantially dry and comprises a mixture of said sugar or starch, aluminum chloride and ethylene glycol.

24. A method in accordance with claim 19 wherein said adhesive-free bonding material is dried after application and before pressing, and wherein said pressing operation is carried out in two stages, the first stage being cold pressing and the second stage being hot pressing.

25. A method or providing a waterproof bond between solid lignocellulose materials, comprising:

applying to said solid lignocellulose material an amount sufficient to effect bonding in the range of from 2-32 grams per 1000 cm² of area of said lignocellulosic material of an adhesive-free bonding composition having a pH after heating of 3.5 to 5.5 and comprising sugar, starch or mixtures thereof, an alkaline buffering agent, and catalyst capable of catalyzing transformation of the sugar and starch to the surface of the lignocellulose material, the amount of catalyst being from 1 to 100% by weight of the carbohydrate; and pressing said solid lignocellulose material together at about 140°–230° C. at a pressure in the range of about 5–50 kg/cm² for about 0.2 to 2 minutes per mm of thickness of said solid lignocellulosic material.

26. A method in accordance with claim 1 wherein said layer of bonding material is applied as a composition of said sugar, starch or mixture thereof, and said catalyst and said alkaline material, and said composition is heated.

27. A method in accordance with claim 1 wherein said bonding material is applied as a layer containing up to 32 grams of added sugar, starch or mixture thereof per 1000 cm² of surface.

28. A method in accordance with claim 26 wherein said composition is applied in an amount sufficient to fill surface voids of said lignocellulosic material.

29. A method of bonding solid lignocellulosic materials and thereby producing a waterproof bond, which comprises providing on a surface of said solid lignocellulosic material an adhesive-free bonding material consisting essentially of at least one sugar, starch or mixture thereof and an amount sufficient to catalyze transformation of the sugar or starch of a catalyst capable of transformation of the sugar or starch to cause waterproof bonding of adjacent lignocellulosic surfaces, said catalyst being selected from alkaline salts or a mixture of an alkaline material and an acidic salt so that said bonding material will not significantly lower the pH of the bonded lignocellulosic material and pressing surfaces of the lignocellulosic material together at en elevated temperature and for a time sufficient to effect said bonding by said transformation reactions of the carbohydrate, and wherein the time, temperature and pressure are sufficient to produce a waterproof bond.

30. Waterproof, solid bonded lignocellulosic material, prepared by the process of claim 1.

* * * * *

UNITED STATES PATENT OFFICE
CERTIFICATE OF CORRECTION

Patent No. 4,183,997         Dated January 15, 1980

Inventor(s) John STOFKO

It is certified that error appears in the above-identified patent and that said Letters Patent are hereby corrected as shown below:

On the Title page, Items [75] and [73] should read as follows:

[75] Inventor: John Stofko, St. Charles, Illinois

[73] Assignee: John Stofko, St. Charles, Illinois and John Jansky, Paris, France, Joint Owners Signed and Sealed this Twenty-ninth Day of April 1980

[SEAL]

Attest:

SIDNEY A. DIAMOND

Attesting Officer    Commissioner of Patents and Trademarks